US012653115B2

(12) United States Patent
Ramos Fernandez

(10) Patent No.: US 12,653,115 B2
(45) Date of Patent: Jun. 16, 2026

(54) METHOD FOR THE PRODUCTION OF BIOMASS

(71) Applicant: Antonio Ramos Fernandez, Granada (ES)

(72) Inventor: Antonio Ramos Fernandez, Granada (ES)

( * ) Notice: Subject to any disclaimer, the term of this patent is extended or adjusted under 35 U.S.C. 154(b) by 0 days.

(21) Appl. No.: 18/861,899

(22) PCT Filed: Mar. 24, 2023

(86) PCT No.: PCT/EP2023/057630
§ 371 (c)(1),
(2) Date: Oct. 31, 2024

(87) PCT Pub. No.: WO2023/213474
PCT Pub. Date: Nov. 9, 2023

(65) Prior Publication Data
US 2025/0107481 A1 Apr. 3, 2025

(30) Foreign Application Priority Data
May 3, 2022 (EP) .................................... 22382425

(51) Int. Cl.
*A01G 17/00* (2006.01)

(52) U.S. Cl.
CPC .................................. *A01G 17/005* (2013.01)

(58) Field of Classification Search
CPC .................................................... A01G 17/005
See application file for complete search history.

(56) References Cited

U.S. PATENT DOCUMENTS

| | | | |
|---|---|---|---|
| 6,250,237 B1 | 6/2001 | Licht | |
| 8,839,554 B2 | 9/2014 | Harari | |
| 2003/0196375 A1* | 10/2003 | Ferro ..................... | A01C 11/04 47/58.1 SC |
| 2009/0007537 A1 | 1/2009 | Savoie et al. | |

FOREIGN PATENT DOCUMENTS

| | | | | |
|---|---|---|---|---|
| CN | 1200233 | A | * 12/1998 | |
| CN | 102771354 | B | * 12/2013 | |
| CN | 104686283 | A | * 6/2015 | ........... A01G 17/005 |
| CN | 105230431 | A | * 1/2016 | ........... A01G 17/005 |
| CN | 104641916 | B | * 10/2017 | ........... A01G 17/005 |
| CN | 107371440 | A | * 11/2017 | |
| CN | 108834729 | A | * 11/2018 | |
| CN | 110642657 | A | * 1/2020 | |
| CN | 111194695 | A | * 5/2020 | |
| EP | 4272547 | B1 | 8/2024 | |
| ES | 2383337 | B1 | 6/2012 | |
| WO | 2007000450 | A1 | 1/2007 | |

OTHER PUBLICATIONS

Bill. "Coppicing: An Introduction." Coppicing: An Introduction, May 22, 2007, www.woodlands.co.uk/blog/practical-guides/coppicing-an-introduction/. (Year: 2007).*
Mak, Jay, et al. "An assessment of ambient and heated forced air drying pre-treatments for enhancing the quality of various forest biomass feedstocks." Frontiers in Energy Research, vol. 8, Jan. 28, 2020, pp. 1-11, https://doi.org/10.3389/fenrg.2020.00007. (Year: 2020).*
Machine Translation for CN 105230431 (Year: 2025).*
Machine Translation for CN 11194695 (Year: 2025).*
McLean. "Coppicing: The Endless Gift of Trees." University of Washington Botanic Gardens, Mar. 24, 2021, https://botanicgardens.uw.edu/about/blog/2021/03/24/coppicing-the-endless-gift-of-trees/. (Year: 2021).*
Machine Translation of CN 104641916 A (Year: 2026).*
Machine translation of CN 1200233 A (Year: 2026).*
European Patent Office, Communication under Rule 71(3) EPC, Application No. 22382425.1, mailed Apr. 17, 2024, 5 pages.
European Patent Office, Decision to grant a European patent pursuant to Article 97(1) EPC, Application No. 22382425.1, mailed Jul. 25, 2024, 2 pages.
European Patent Office, International Search Report, Application No. PCT/EP2023/057630, mailed Jun. 5, 2023, 2 pages.
Chile Patent Office, Expert Report, Application No. 202403216, dated Oct. 20, 2025, 13 pages.
China National Intellectual Property Administration, First Notification of Office Action, Application No. 202380037301.9, mailed Jan. 25, 2025, 7 pages.

(Continued)

*Primary Examiner* — Marisa V Conlon
*Assistant Examiner* — Hae Rie Jessica Byun
(74) *Attorney, Agent, or Firm* — Ziegler IP Law Group, LLC.

(57) ABSTRACT

A method for the production of biomass including: planting rows of poplar saplings or cuttings of the species *Populus nigra* or *Populus tremula* in ridges with a density greater than 40,000 units per hectare; cutting the plantation annually at the ridge level for a period of 15 to 20 years, and obtaining in each annual cut poplar stalks having a length less than 7 meters and a diameter less than 6 centimeters, and cutting the poplar stalks transversely into substantially cylindrical blocks of biomass having an adjustable length and a variable diameter, coinciding with the diameter of the poplar stalks in the cutting areas.

3 Claims, No Drawings

(56)           References Cited

OTHER PUBLICATIONS

China National Intellectual Property Administration, Search Report, Application No. 202380037301.9, mailed Jan. 25, 2025, 2 pages.

Maria Pilar Ciria "Poplar Cultivation For Energy Purposes" Revista Vida Rural Apr. 15, 2009, 4 pages, English Translation, 4 pages.

Shuyun et al. "Overview of Research on Fast-Growing Poplar Trees" Journal of Agricultural Science Yanbian University, vol. 22 No. 1 Mar. 2000, 6 pages, English Translation, 7 pages.

Sixto et al. "Plantations of the genus Populus for biomass production for energy purposes" Agricultural Research: Forest Systems and Resources, 2007 16(3), ISSN: 1131-7965, 18 pages, English Translation 15 pages.

* cited by examiner

METHOD FOR THE PRODUCTION OF BIOMASS

FIELD OF THE ART

The present invention is applicable in the sector dedicated to the production of biomass which can be used as fuel in plants for generating electrical energy, heat energy, or any other type of energy.

PRIOR STATE OF THE ART

There are currently different installations which use biomass as fuel to generate heat or electricity.

This biomass is obtained mainly from trees felled in a controlled manner or from waste remaining from said trees once the wood thereof has been used for other applications.

Generally, this biomass is in the form of pellets or bricks made up of a mixture of ground wood and a glue or binder which, when suitably pressed, forms small cylinders.

One of the fundamental drawbacks in the preparation of this biomass is determined by the high cost of wood grinding, of the binder, and of the pressing process for obtaining the end product in the form of pellets.

Another drawback is the low output of the tree plantations intended for obtaining biomass.

For example, patent ES 2 383 337 B1 which claims priority to U.S. Pat. No. 8,839,554 B2 describes a method for using Tamarix Erect trees for the production of biomass fuel. Tamarix Erect trees are planted and/or cultivated in an area of land. After growth of biomass of the Tamarix Erect trees, at least a portion of the biomass is harvested for the biomass fuel. The planting may be performed with a density greater than 6000 Tamarix Erectos trees per hectare.

Due to their growth rate and morphology, Tamarix Erect trees have space requirements which limit the density of trees per hectare and a relatively short productivity period.

Therefore, the technical problem being considered relates to the development of a method for the production of biomass which allows obtaining a high output in a plantation and minimizing the cost for obtaining a biomass suitable for consumption.

DISCLOSURE OF THE INVENTION

The proposed objective can be achieved through the development of a method for the production of biomass, object of this invention, which is based on cultivating black poplar (*Populus nigra*) or European aspen (*Populus tremula*) trees in specific conditions which, as a result of their elongated morphology and rapid growth rate, allow obtaining a high production of biomass per hectare and the direct attainment of blocks or portions of biomass with dimensions suitable for use by means of cutting, making it unnecessary to grind the biomass, to mix it with binders, and to form, by pressing, pieces of biomass with a size suitable for consumption; this allows the cost for obtaining the biomass to be considerably reduced.

The method for the production of biomass, object of this invention, comprises the following steps:

Defining parallel rows of ridges in arable land:

Planting rows of saplings or cuttings of the indicated poplar species in said ridges with a density greater than 40,000 units per hectare.

Cutting the plantation annually at the ridge level for a period of 15 to 20 years and obtaining in each annual cut poplar stalks having a length less than 7 meters and a diameter less than 6 centimeters, utilizing only the stalks which meet said dimensions as biomass.

Cutting the stalks transversely into pieces or blocks of biomass having a length adjustable to the type of boiler and a diameter coinciding with the diameter of the poplar stalks in the cutting areas.

The indicated poplar species (*Populus nigra* or *Populus tremula*) for this method for the production of biomass was selected based on a series of parameters, specifically:

The species is a deciduous tree with a high growth capacity which allows, in the first year of growth of the sapling or cutting, the formation of a stalk measuring 5 or 6 meters with a base diameter of 4 to 6 cm during its annual vegetation period and, in subsequent years, the sprouting of several cuttings, generally 1 to 5, from the trunk cut in the first year which, during the annual vegetation period, regenerate stalks having dimensions similar to those of the first year since an increase in the root of the initial sapling or cutting has also occurred in this first year.

The species is furthermore a tree with an elongated morphology which does not produce a wide crown, allowing the cuttings or saplings to be planted with a smaller separating distance, and accordingly, allowing a plantation with a high density of trees per hectare, greater than the aforementioned 40,000 units, even reaching 65,000 trees per hectare, to be obtained.

The dimensions of the poplar stalks harvested annually reach a maximum diameter of 4 to 6 centimeters and cutting the poplar stalks transversely, for example by means of a disc cutter, allows blocks or pieces of biomass having dimensions suitable for consumption to be obtained directly from said stalks, without having to grind the biomass, mix it with a binding agent, and compress it to obtain portions of biomass in the form of pellets.

According to the invention, the ridges made on the ground are arranged in pairs and have a height comprised between 10 and 15 centimeters given that the cutting to be planted in the first year will have a length of between 20 and 30 centimeters, the ridges of each pair being separated by between 70 and 80 centimeters, and the pairs of ridges being separated by between 100 and 150 centimeters.

Planting the cuttings or saplings on the ridges allows poplar stalks to be cut annually, by means of machines, right above the ridges, such that the blades of the machines do not hit any stones or irregularities on the base of the terrain, and such that they do not break or become damaged, increasing production costs.

The separating distance of 70 to 80 centimeters between the ridges of each pair allows the trees to be widened sufficiently in the lateral direction, allowing the planting distance between successive poplar (*Populus nigra* or *Populus tremula*) cuttings or saplings on one and the same ridge to be greatly reduced.

The separating distance of 100 to 150 centimeters between the pairs of ridges is calculated to allow the circulation of machines which perform the annual cutting and harvesting of poplar stalks.

In a specific embodiment and in a preferred manner, in order to optimize the production capacity per hectare of the poplar plantation, the ridges of each pair are separated by 75 centimeters, and the pairs of ridges are separated by 125 centimeters, so as to allow the cutting and harvesting machines to pass with enough clearance.

According to the invention and taking into account the separating distances indicated above between the ridges of each pair and between the pairs of ridges, the distance between successive saplings or cuttings on one and the same ridge is comprised between 15 and 25 centimeters, allowing the mentioned concentration of 65,000 trees per hectare to be achieved in the plantation.

The growth of poplar (*Populus nigra* or *Populus tremula*) saplings or cuttings of the initial plantation may be compromised by the uncontrolled growth of weeds, therefore, this method comprises covering the terrain between saplings with an anti-weed sheet or mesh during the first year.

Poplars of the indicated species grow in very wet or flooded land, therefore, plantations consisting of these poplar species are often irrigated by means of flooding, which requires water consumption of about 18,000 and 20,000 cubic meters per hectare per year, drastically limiting the possible areas where the plantation can be located due to the lack of water resources.

According to the invention, to avoid this drawback, the plantation is irrigated by means of drip irrigation, with an annual water consumption comprised between 2300 and 2800 cubic meters per hectare per year, which represents a drastic reduction of the amount of irrigation water required and substantially broadens the possible areas where the plantation for obtaining biomass can be located.

The present invention also contemplates using waste water for irrigation once said waste water has overcome a first decantation: heavy and floating solids, such that no fertilizer would be needed.

Additionally, mycorrhizae are incorporated in the irrigation water in an amount comprised between 0.8 and 1.2 liters/hectare during the first year of cultivation for the purpose of reducing the amount of water needed for irrigating the plantation and of favoring nutrient absorption by tree roots.

4

The invention claimed is:

1. A method for the production of biomass, which comprises:

planting rows of black poplar (*Populus nigra*) or European aspen (*Populus tremula*) cuttings in ridges with a density greater than 40,000 units per hectare, wherein the cuttings to be planted in the first year have a length of between 20 and 30 centimeters, cutting the planted rows of black poplar (*Populus nigra*) or European aspen (*Populus tremula*) annually at the ridge level for a period of 15 to 20 years, and obtaining in each annual cut poplar stalks having a length less than 7 meters and a diameter less than 6 centimeters, cutting the poplar stalks transversely into substantially cylindrical blocks of biomass having a length selected during cutting based on the type of boiler in which the blocks will be used as fuel and a diameter corresponding to the diameter of the poplar stalks in the cutting area, wherein the ridges have a height between 10 and 15 centimeters and are arranged in pairs, and each pair comprises two ridges separated from each other by a distance between 70 and 80 centimeters, and each pair of ridges is separated from the next adjacent pair of ridges by a distance between 100 and 150 centimeters.

2. The method according to claim 1, wherein the poplar cuttings within the same ridge row are separated by a distance between 15 and 25 centimeters.

3. The method according to claim 1, which comprises covering the terrain between saplings with a permeable anti-weed sheet or mesh during the first year of cultivation.

* * * * *